US012563212B2

(12) United States Patent
Huang et al.

(10) Patent No.:    US 12,563,212 B2
(45) Date of Patent:       Feb. 24, 2026

(54) VIDEO PROCESSING CIRCUIT FOR PERFORMING SIZE-BASED PARALLEL IN PARALLEL OUT COMPUTATION WITH BUBBLE CYCLE REDUCTION

(71) Applicant: MEDIATEK INC., Hsin-Chu (TW)

(72) Inventors: Li-Ren Huang, Hsinchu City (TW);
Chia-Yun Cheng, Hsinchu City (TW);
Min-Hao Chiu, Hsinchu City (TW);
Hsueh-Yen Shen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 576 days.

(21) Appl. No.: 17/945,115

(22) Filed: Sep. 15, 2022

(65) Prior Publication Data

US 2023/0100895 A1      Mar. 30, 2023

Related U.S. Application Data

(60) Provisional application No. 63/247,817, filed on Sep. 24, 2021.

(51) Int. Cl.
*H04N 19/423*        (2014.01)
*G06F 12/08*         (2016.01)
(52) U.S. Cl.
CPC ........... *H04N 19/423* (2014.11); *G06F 12/08* (2013.01)

(58) Field of Classification Search
CPC .................................................... H04N 19/423
USPC ..................................................... 375/240.24
See application file for complete search history.

(56) References Cited

U.S. PATENT DOCUMENTS

| | | | | |
|---|---|---|---|---|
| 2015/0195522 A1 | 7/2015 | Li | | |
| 2015/0195537 A1* | 7/2015 | Henry | .................. | H04N 19/625 |
| 2020/0388000 A1* | 12/2020 | Ward | .................... | G06T 3/4007 |
| 2022/0321899 A1* | 10/2022 | Matsuba | ................ | H04N 19/18 |
| 2023/0007283 A1* | 1/2023 | Gudumasu | ........... | H04N 19/139 |

FOREIGN PATENT DOCUMENTS

| | | |
|---|---|---|
| CN | 103181169 A | 6/2013 |
| CN | 107211146 A | 9/2017 |
| CN | 109218822 A | 1/2019 |
| CN | 113424169 A | 9/2021 |
| WO | 2021/108341 A1 | 6/2021 |

* cited by examiner

*Primary Examiner* — Yulin Sun
(74) *Attorney, Agent, or Firm* — Winston Hsu

(57) ABSTRACT

A video processing circuit includes a first buffer and a computation circuit. Before a second one-dimensional processing operation is performed upon a plurality of consecutive blocks in a second direction, the first computation circuit generates a first processing result for each of the plurality of consecutive blocks by performing a first one-dimensional processing operation upon each of the plurality of consecutive blocks in a first direction that is different from the second direction, and further stores a plurality of first processing results of the plurality of consecutive blocks into the first buffer.

17 Claims, 13 Drawing Sheets

802

Regular input from
previous stage or TM out

1102 — Idle

1104 — Push data into SIVO buffer in constant throughput

1106 — At least one variable-size line in SIVO buffer?    No

Yes

1108 — Push data of one complete variable-size line into SPIPO computation circuit 1110 — Push processed data of one complete variable-size line into VISO buffer

VIDEO PROCESSING CIRCUIT FOR PERFORMING SIZE-BASED PARALLEL IN PARALLEL OUT COMPUTATION WITH BUBBLE CYCLE REDUCTION

CROSS REFERENCE TO RELATED APPLICATIONS

This application claims the benefit of U.S. Provisional Application No. 63/247,817, filed on Sep. 24, 2021. The content of the application is incorporated herein by reference.

BACKGROUND

The present invention relates to video processing, and more particularly, to a video processing circuit for performing size-based parallel in and parallel output computation (e.g. transform or inverse transform) with bubble cycle reduction.

The conventional video coding standards generally adopt a block based coding technique to exploit spatial and temporal redundancy. For example, the basic approach is to divide the whole source picture into a plurality of blocks, perform intra/inter prediction on each block, transform residuals of each block, and perform quantization and entropy encoding. Besides, a reconstructed picture is generated in a coding loop to provide reference pixel data used for coding following blocks. For certain video coding standards, in-loop filter(s) may be used for enhancing the image quality of the reconstructed picture. The video decoder is used to perform an inverse operation of a video encoding operation performed by a video encoder. For example, a transform circuit and an inverse transform circuit are employed by the video encoder, and an inverse transform circuit is employed by the video decoder. The transform circuit is used to transform residual data from a spatial domain to a frequency domain. The inverse transform circuit is used to transform residual data from a frequency domain to a spatial domain. Taking discrete cosine transform (DCT) for example, the forward DCT (FDCT) of an N×N sample block is given by: $Y=AXA^T$, and an inverse DCT (IDCT) is given by: $X=A^TYA$, where X is a matrix of samples, Y is a matrix of coefficients, and A is an N×N transform matrix. The elements of A are:

$$A_{ij} = C_i \cos\frac{(2j+1)i\pi}{2N}, \text{ where } C_i = \sqrt{\frac{1}{N}} \ (i = 0), C_i = \sqrt{\frac{2}{N}} \ (i > 0).$$

Hence, the conventional FDCT/IDCT hardware implementation may include 2 stages, where the $1^{st}$ stage is for one of horizontal one-dimensional (1D) transform and vertical 1D transform, and the $2^{nd}$ stage is for the other of horizontal 1D transform and vertical 1D transform. In order to save the computation resource, the scheme of re-using a transform kernel for both of the $1^{st}$ stage and the $2^{nd}$ stage is commonly used. However, such conventional architecture of re-using one transform kernel suffers from bubble cycles caused by switching between the $1^{st}$ stage and the $2^{nd}$ stage, and also suffers from bubble cycles caused by switching from a small block to a large block. As a result, the performance of the conventional architecture drops significantly when a series of small blocks and/or blocks with frequent block size changing need to be processed.

SUMMARY

One of the objectives of the claimed invention is to provide a video processing circuit for performing size-based parallel in and parallel output computation (e.g. transform or inverse transform) with bubble cycle reduction.

According to a first aspect of the present invention, an exemplary video processing circuit is disclosed. The exemplary video processing circuit includes a first buffer and a first computation circuit. Before a second one-dimensional processing operation is performed upon a plurality of consecutive blocks in a second direction, the first computation circuit is arranged to generate a first processing result for each of the plurality of consecutive blocks by performing a first one-dimensional processing operation upon each of the plurality of consecutive blocks in a first direction that is different from the second direction, and is further arranged to store a plurality of first processing results of the plurality of consecutive blocks into the first buffer.

According to a second aspect of the present invention, an exemplary video processing circuit is disclosed. The exemplary video processing circuit includes a computation circuit and a buffer. The computation circuit is arranged to generate a processing result for each of a plurality of consecutive blocks by performing a one-dimensional processing operation upon each of the plurality of consecutive blocks in one direction. The buffer is coupled to the computation circuit. Input data of the buffer is serially pushed into the buffer. All data of a complete line included in each of the plurality of consecutive blocks is popped from the buffer and transmitted to the computation circuit in a parallel fashion. The buffer buffers data belonging to different lines at a same time.

According to a third aspect of the present invention, an exemplary video processing circuit is disclosed. The exemplary video processing circuit includes a computation circuit and a buffer. The computation circuit is arranged to generate a processing result for each of a plurality of consecutive blocks by performing a one-dimensional processing operation upon each of the plurality of consecutive blocks in one direction. The buffer is coupled to the computation circuit. All data of a complete line included in each of the plurality of consecutive blocks is generated from the computation circuit and pushed into the buffer in a parallel fashion. Data buffered in the buffer is serially popped from the buffer. The buffer buffers data belonging to different lines at a same time.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
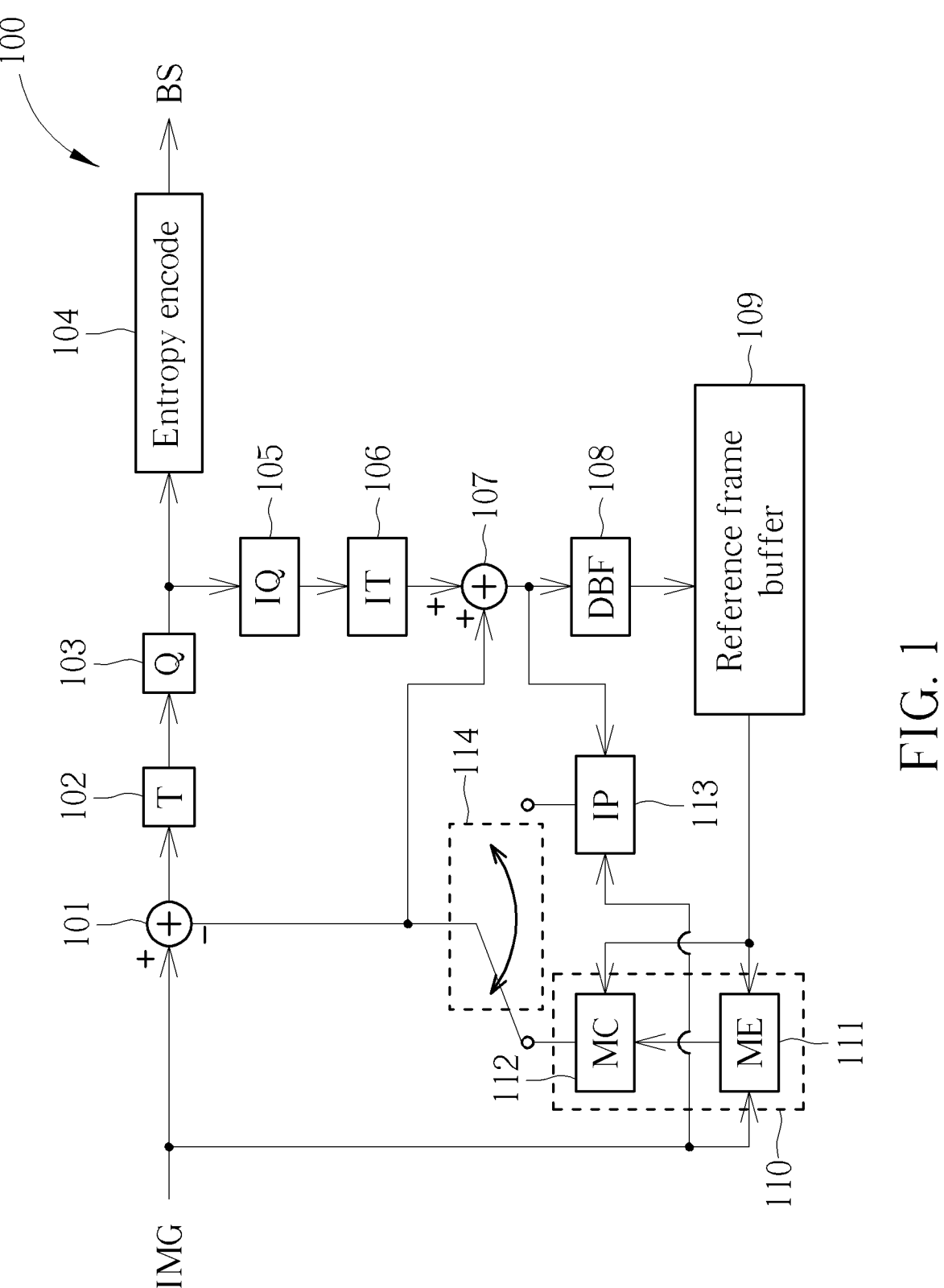
FIG. 1 is a diagram illustrating a video encoding apparatus according to an embodiment of the present invention.

FIG. 1 is a diagram illustrating a video encoding apparatus according to an embodiment of the present invention. The video encoding apparatus 100 is a hardware circuit used to compress raw video data to generate compressed video data. It should be noted that the video encoder architecture shown in FIG. 1 is for illustrative purposes only, and is not meant to be a limitation of the present invention. For example, the architecture of the video encoding apparatus 100 may vary, depending upon the coding standard. The video encoding apparatus 100 encodes one frame IMG to generate one bitstream BS for transmission. As shown in FIG. 1, the video encoding apparatus 100 includes a residual calculation circuit 101, a transform circuit (labeled by "T") 102, a quantization circuit (labeled by "Q") 103, an entropy encoding circuit (labeled by "Entropy encode") 104, an inverse quantization circuit (labeled by "IQ") 105, an inverse transform circuit (labeled by "IT") 106, a reconstruction circuit 107, an in-loop filter (e.g. a deblocking filter 108, labeled by "DBF"), a reference frame buffer 109, an inter prediction circuit 110 (which includes a motion estimation circuit (labeled by "ME") 111 and a motion compensation circuit (labeled by "MC") 112), an intra prediction circuit (labeled by "IP") 113, and an intra/inter mode selection switch 114. One or both of the transform circuit 102 and the inverse transform circuit 106 may be implemented by the proposed size-based parallel in and parallel out (SPIPO) computation architecture. Since the present invention is focused on SPIPO computation (e.g. transform and/or inverse transform) and a person skilled in the art should readily understand principles of the rest of function blocks in the video encoding apparatus 100, further description of the video encoding apparatus 100 is omitted here for brevity.

Figure 2:
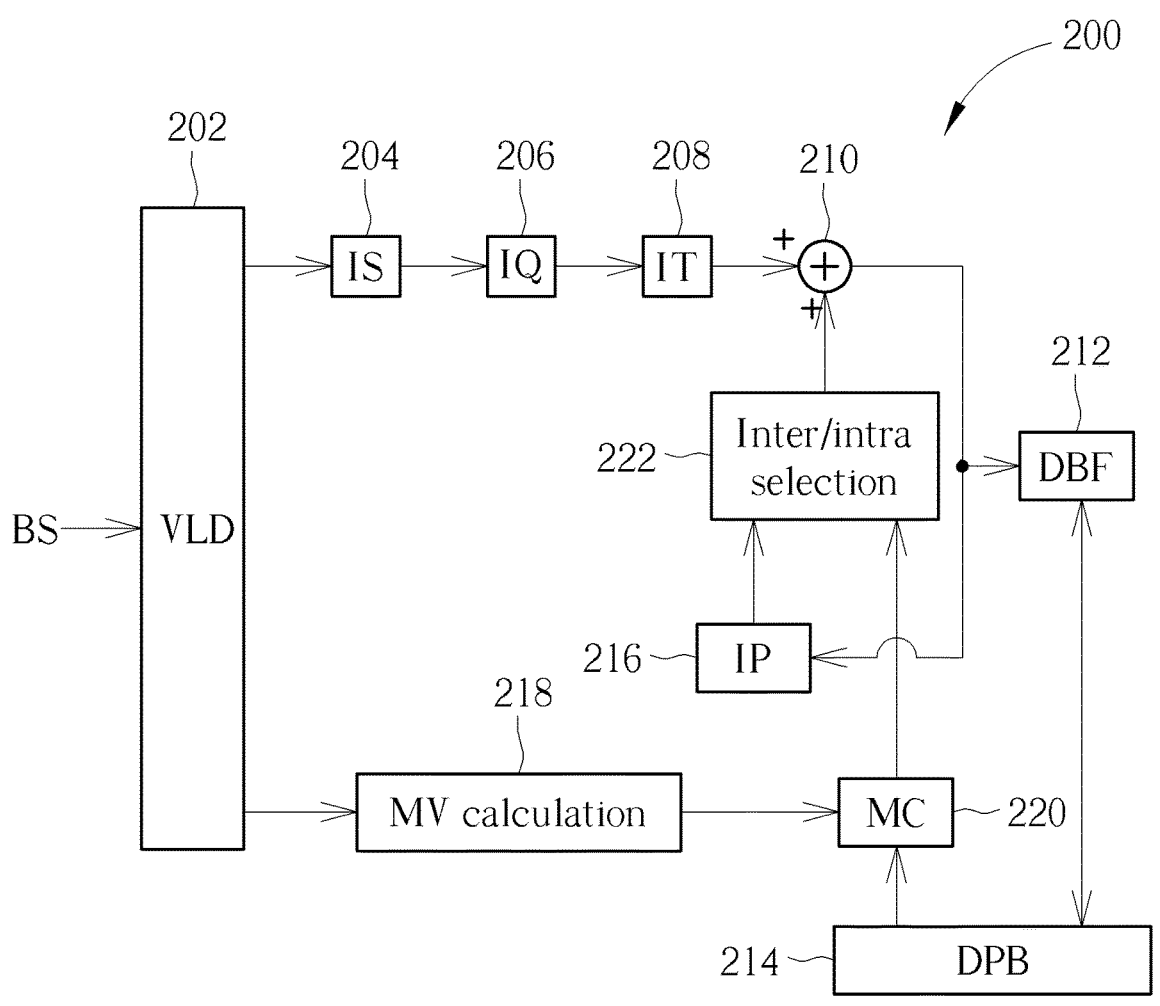
FIG. 2 is a block diagram illustrating a video decoding apparatus according to an embodiment of the present invention.

FIG. 2 is a block diagram illustrating a video decoding apparatus according to an embodiment of the present invention. The video decoding apparatus 200 is a hardware circuit used to decompress encoded video data carried by the bitstream BS to generate decompressed video data. It should be noted that the video decoder architecture shown in FIG. 2 is for illustrative purposes only, and is not meant to be a limitation of the present invention. For example, the architecture of the video decoding apparatus 200 may vary, depending upon the coding standard. As shown in FIG. 2, the video decoding apparatus 200 may include an entropy decoding circuit (e.g. a variable length decoding circuit 202, labeled by "VLD"), an inverse scan circuit (labeled by "IS") 204, an inverse quantization circuit (labeled by "IQ") 206, an inverse transform circuit (labeled by "IT") 208, a reconstruction circuit 210, an in-loop filter (e.g. de-blocking filter 212, labeled by "DBF"), a decoded picture buffer (DPB) 214, an intra prediction circuit (labeled by "IP") 216, a motion vector calculation circuit (labeled by "MV calculation") 218, a motion compensation circuit (labeled by "MC") 220, and an inter/intra selection circuit (labeled by Inter/intra selection") 222. The inverse transform circuit 208 may be implemented by the proposed SPIPO computation architecture. Since the present invention is focused on SPIPO computation (e.g. transform and/or inverse transform) and a person skilled in the art should readily understand principles of the rest of function blocks in the video decoding apparatus 200, further description of the video decoding apparatus 200 is omitted here for brevity.

Figure 3:
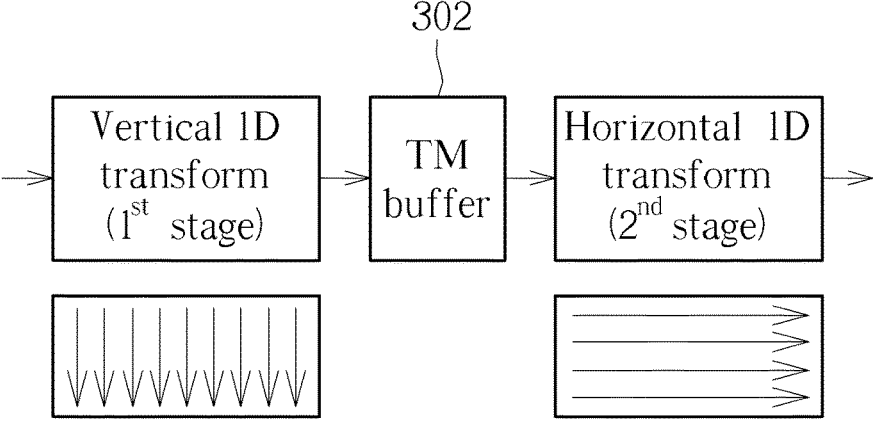
FIG. 3 is a diagram illustrating an SPIPO computation procedure according to an embodiment of the present invention.

FIG. 3 is a diagram illustrating an SPIPO computation procedure according to an embodiment of the present invention. The transform circuit 102 may follow the SPIPO computation procedure. Similarly, the inverse transform circuit 106/208 may also follow the SPIPO computation procedure. The SPIPO computation procedure includes two stages, including a $1^{st}$ stage performed for one of a horizontal 1D transform and a vertical 1D transform, and a $2^{nd}$ stage performed for the other of the horizontal 1D transform and the vertical 1D transform. One picture/frame may be divided into a plurality of coding units (CUs), each CU may be divided into a plurality of transform units (TUs), and each TU may consist of multiple transform blocks (TBs). For example, one TU may consist of one luma TB and two chroma TBs. One line of a transform block in a first direction (e.g. one column in the vertical direction) is processed by the $1^{st}$ stage, and one line of the transform block in a second direction (e.g. one row in the horizontal direction) is processed by the $2^{nd}$ stage. Hence, a transpose memory (TM) buffer 302 is used to buffer output data of the $1^{st}$ stage (e.g. vertical 1D transform), and provide transposed data as input data of the $2^{nd}$ stage (e.g. horizontal 1D transform).

Figure 4:
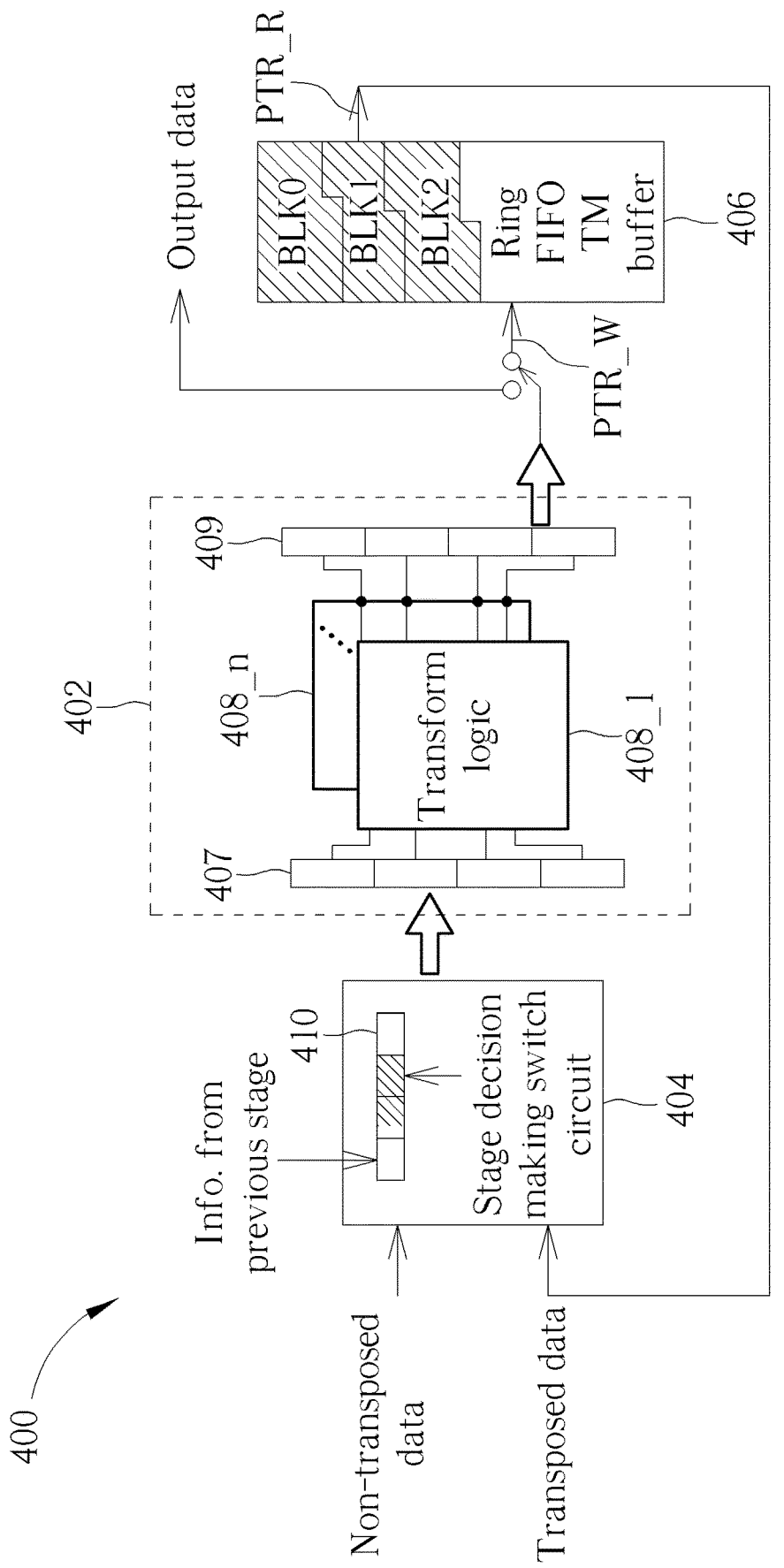
FIG. 4 is a diagram illustrating a video processing circuit with high performance serial architecture according to an embodiment of the present invention.

FIG. 4 is a diagram illustrating a video processing circuit with high performance serial architecture according to an embodiment of the present invention. For example, the transform circuit 102 of the video encoding apparatus 100 may be implemented by the video processing circuit 400. For another example, the inverse transform circuit 106 of the video encoding apparatus 100 may be implemented by the video processing circuit 400. For yet another example, the inverse transform circuit 208 of the video decoding apparatus 200 may be implemented by the video processing circuit 400. In accordance with the high performance serial architecture, the video processing circuit 400 includes an SPIPO computation circuit 402, a stage decision making switch circuit 404, and a ring first in, first output (FIFO) TM buffer 406. The SPIPO computation circuit 402 is a transform kernel that can deal with transform from a spatial domain to a frequency domain or inverse transform from a frequency domain to a spatial domain. The SPIPO computation circuit 402 may include a plurality of transform logic circuits (labeled by "Transform logic") 408_1-408_$n$ for a plurality of coding standards, respectively. For example, the transform logic circuit 408_1 is designed for dealing with transform/inverse transform in compliance with versatile video coding (VVC) standard (also known as H.266 standard), and the transform logic circuit 408_$n$ is designed for dealing with transform/inverse transform in compliance with a different video coding standard.

To address the bubble cycle issue resulting from switching between the $1^{st}$ stage and the $2^{nd}$ stage, the SPIPO computation circuit 402 is designed to support processing of consecutive blocks (i.e. consecutive TBs) in a row at the same stage, the ring FIFO TM buffer 406 is designed to support buffering of $1^{st}$ stage processing results of consecutive blocks (i.e. consecutive TBs), and/or the stage decision making switch circuit 404 is designed to support adaptive switching between $1^{st}$ stage processing and $2^{nd}$ stage processing. In this embodiment, the SPIPO computation circuit 402 is used to deal with a first one-dimensional processing operation in a first direction (e.g. $1^{st}$ stage transform in a vertical direction), and is re-used to deal with a second one-dimensional processing operation in a second direction (e.g. $2^{nd}$ stage transform in a horizontal direction) for saving the computation resource. Before the $2^{nd}$ stage processing operation (e.g. horizontal 1D transform) is performed upon a plurality of consecutive blocks (e.g. BLK0, BLK1, and BLK2) in the second direction (e.g. horizontal direction), the SPIPO computation circuit 402 generates a $1^{st}$ stage processing result for each of the consecutive blocks (e.g. BLK0, BLK1, and BLK2) by performing the first one-dimensional processing operation (e.g. $1^{st}$ stage transform in a horizontal direction), and stores a plurality of $1^{st}$ stage processing results of the consecutive blocks (e.g. BLK0, BLK1, and BLK2) into the ring FIFO TM buffer 406. Regarding the ring FIFO TM buffer 406, one write pointer PTR W can be updated to point to a next address at which new data should be stored, and one read pointer PTR R can be updated to point to a next address at which stored data should be read. The buffer size of the ring FIFO TM buffer 406 may be properly set to accommodate the $1^{st}$ stage processing result of a transform block with a largest transform block size (e.g. 64×64). In accordance with VVC standard, the possible width and height of one transform block range from 1, 2, 4, 8, 16, 32, to 64. Hence, when the consecutive blocks (e.g. BLK0, BLK1, and BLK2) are small blocks (e.g. 4×4 blocks), the ring FIFO TM buffer 406 can be used to store $1^{st}$ stage processing results of consecutive blocks (e.g. BLK0, BLK1, and BLK2) before the $1^{st}$ stage processing results are transposed and output to the SPIPO computation circuit 402 for undergoing the $2^{nd}$ stage processing.

The stage decision making switch circuit 404 controls an input data source to be adaptively switched between a previous stage and the ring FIFO TM buffer 406. In a case where the stage decision making switch circuit 404 selects the previous stage as the input data source of the SPIPO computation circuit 402, the SPIPO computation circuit 402 enables the $1^{st}$ stage for processing the non-transposed data from the previous stage to generate and output $1^{st}$ stage processing results of consecutive blocks to the ring FIFO TM buffer 406. In another case where the stage decision making switch circuit 404 selects the ring FIFO TM buffer 406 as the input data source of the SPIPO computation circuit 402, the SPIPO computation circuit 402 enables the $2^{nd}$ stage for processing the transposed data from the ring FIFO TM buffer 406 to provide a latter stage with output data of the consecutive blocks. For example, the previous stage is the residual calculation circuit 101 and the latter stage is the quantization circuit 103 when the video processing circuit 400 is used as the transform circuit 102. For another example, the previous stage is the inverse quantization circuit 105 and the latter stage is the reconstruction circuit 107 when the video processing circuit 400 is used as the inverse transform circuit 106. For yet another example, the previous stage is the inverse quantization circuit 206 and the latter stage is the reconstruction circuit 210 when the video processing circuit 400 is used as the inverse transform circuit 208.

In this embodiment, the stage decision making switch circuit 404 may include a look-ahead buffer 410 arranged to buffer information of the consecutive blocks (e.g. BLK0, BLK1, and BLK2) that is provided from the previous stage. The information stored into the look-ahead buffer 410 by the previous stage may include the number of consecutive blocks (e.g. BLK0, BLK1, and BLK2) ready to be transferred from the previous stage to the video processing circuit 400, the block size of each of the consecutive blocks (e.g. BLK0, BLK1, and BLK2), etc. The stage decision making switch circuit 404 refers to the information in the look-ahead buffer 410 for adaptively selecting one of the non-transposed data (which is provided from the previous stage) and the transposed data (which is provided from the ring FIFO TM buffer 406) as the input data of the SPIPO computation circuit 402.

Figure 5:
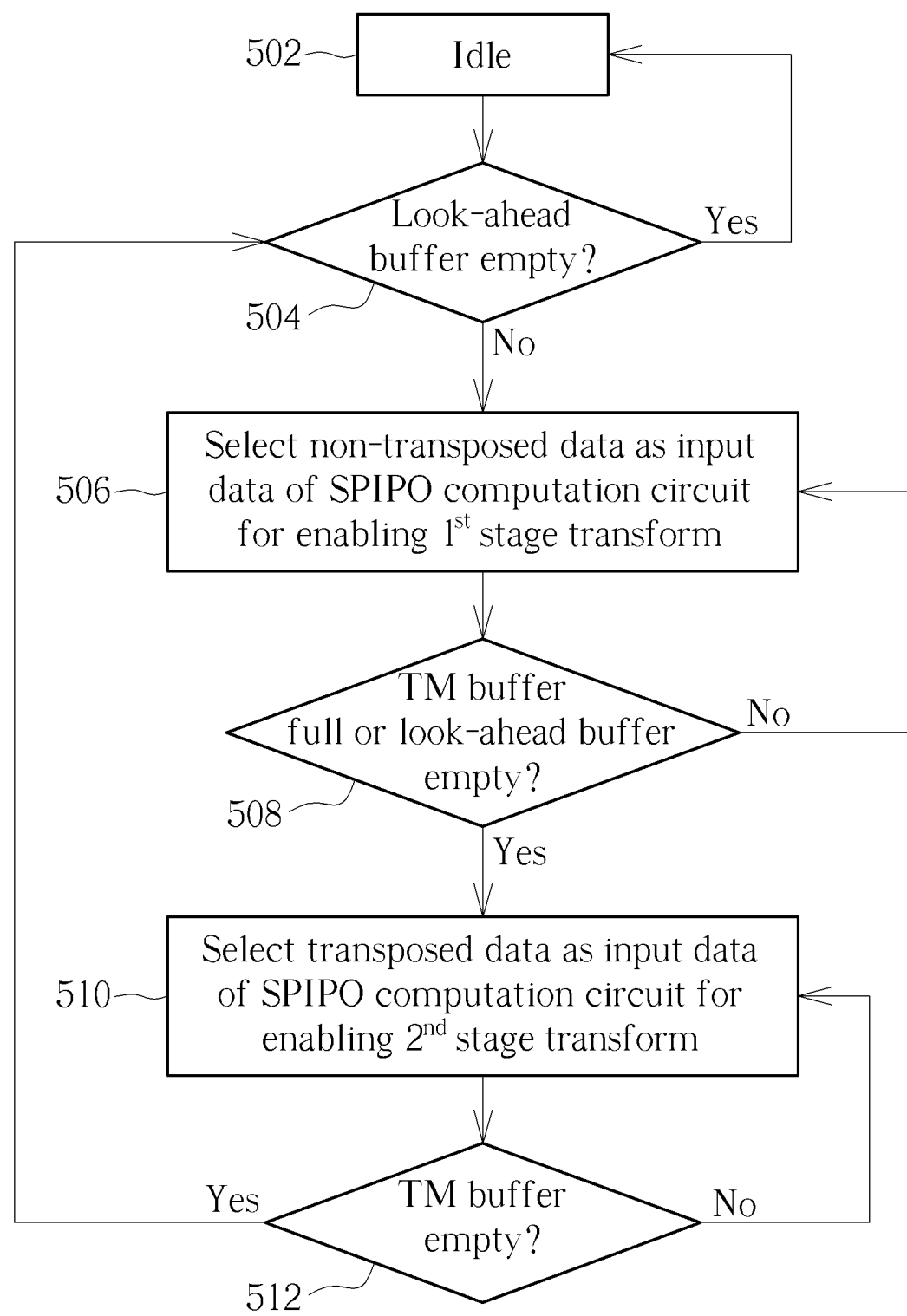
FIG. 5 is a flowchart illustrating a stage decision making method according to an embodiment of the present invention.

FIG. 5 is a flowchart illustrating a stage decision making method according to an embodiment of the present invention. The stage decision making method may be employed by the stage decision making circuit 404. Provided that the result is substantially the same, the steps are not required to be executed in the exact order shown in FIG. 5. Initially, the stage decision making circuit 404 enters an idle state (Step 502). At step 504, the stage decision making circuit 404 checks if the look-ahead buffer 410 is empty. If yes, the stage decision making circuit 404 enters the idle state to wait for information provided from the previous stage. If no, the stage decision making circuit 404 selects the non-transposed data transmitted from the previous stage as the input data of the SPIPO computation circuit 402, thereby enabling the $1^{st}$ stage transform at the SPIPO computation circuit 402 (Step 506). At step 508, the stage decision making circuit 404 checks if the ring FIFO TM buffer 406 is full or the look-ahead buffer 410 becomes empty. If the ring FIFO TM buffer 406 is full, it implies that the ring FIFO TM buffer 406 is unable to buffer more $1^{st}$ stage processing results, and the SPIPO computation circuit 402 should pause the $1^{st}$ stage transform and enable the $2^{nd}$ stage transform for processing any $1^{st}$ stage processing result buffered in the ring FIFO TM buffer 406. If the look-ahead buffer 410 becomes empty, it implies that there is no non-transposed data waiting to undergo the $1^{st}$ stage transform at this moment, and the SPIPO computation circuit 402 should end the $1^{st}$ stage transform and enable the $2^{nd}$ stage transform for processing any $1^{st}$ stage processing result buffered in the ring FIFO TM buffer 406. At step 510, the stage decision making circuit 404 selects the transposed data transmitted from the ring FIFO TM buffer 406 as the input data of the SPIPO computation circuit 402, thereby enabling the $2^{nd}$ stage transform at the SPIPO computation circuit 402. At step 512, the stage decision making circuit 404 checks if the ring FIFO TM buffer 406 is empty. If the ring FIFO TM buffer 406 is not empty yet, the stage decision making circuit 404 keeps transferring the transposed data from the ring FIFO TM buffer 406 to the SPIPO computation circuit 402. If the ring FIFO TM buffer 406 becomes empty, it implies that each $1^{st}$ stage processing result in the ring FIFO TM buffer 406 has been transposed and output to the SPIPO computation circuit 402 for $2^{nd}$ stage transform. Hence, the flow proceeds with step 504.

Figure 6:
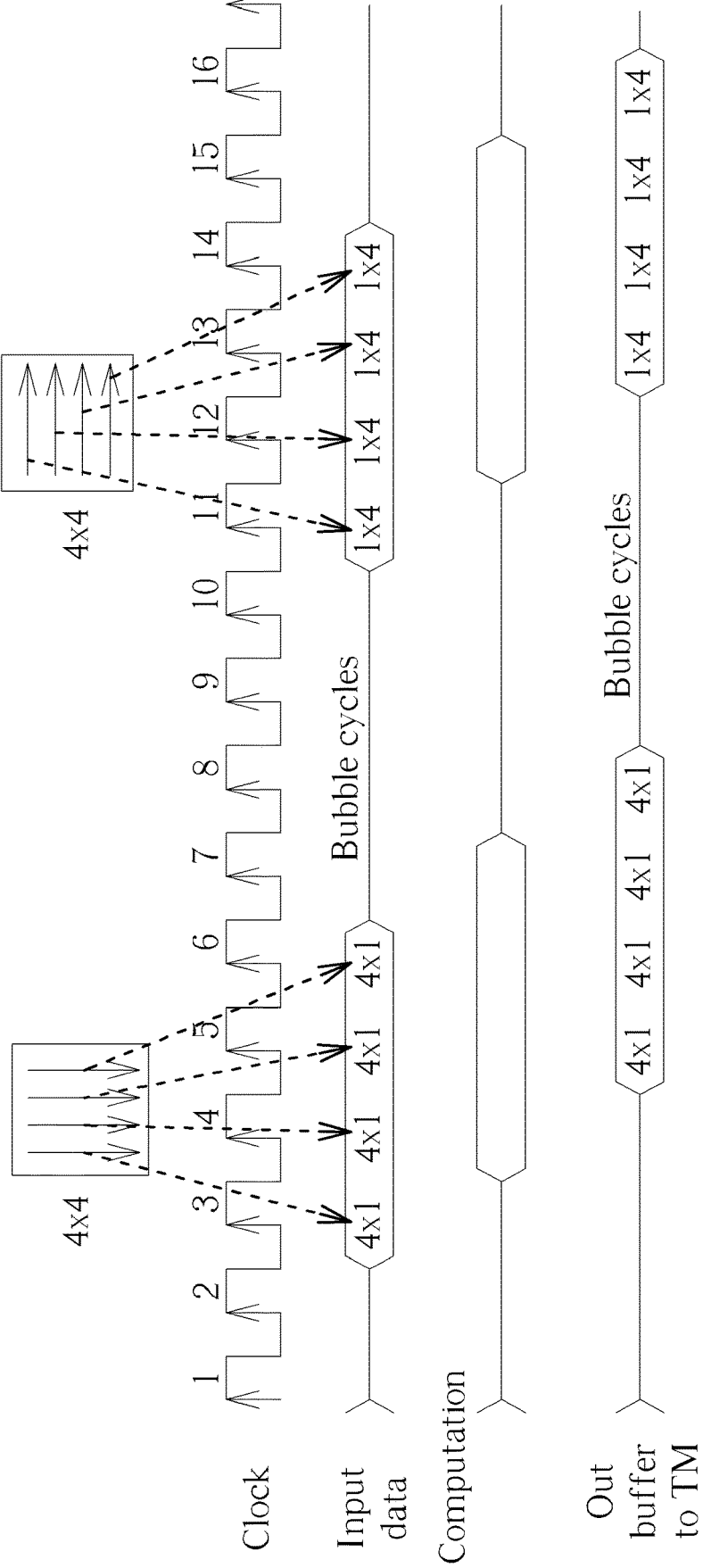
FIG. 6 is a timing diagram of a conventional design with degraded performance due to the bubble cycle issue resulting from switching between the $1^{st}$ stage and the $2^{nd}$ stage.
Figure 7:
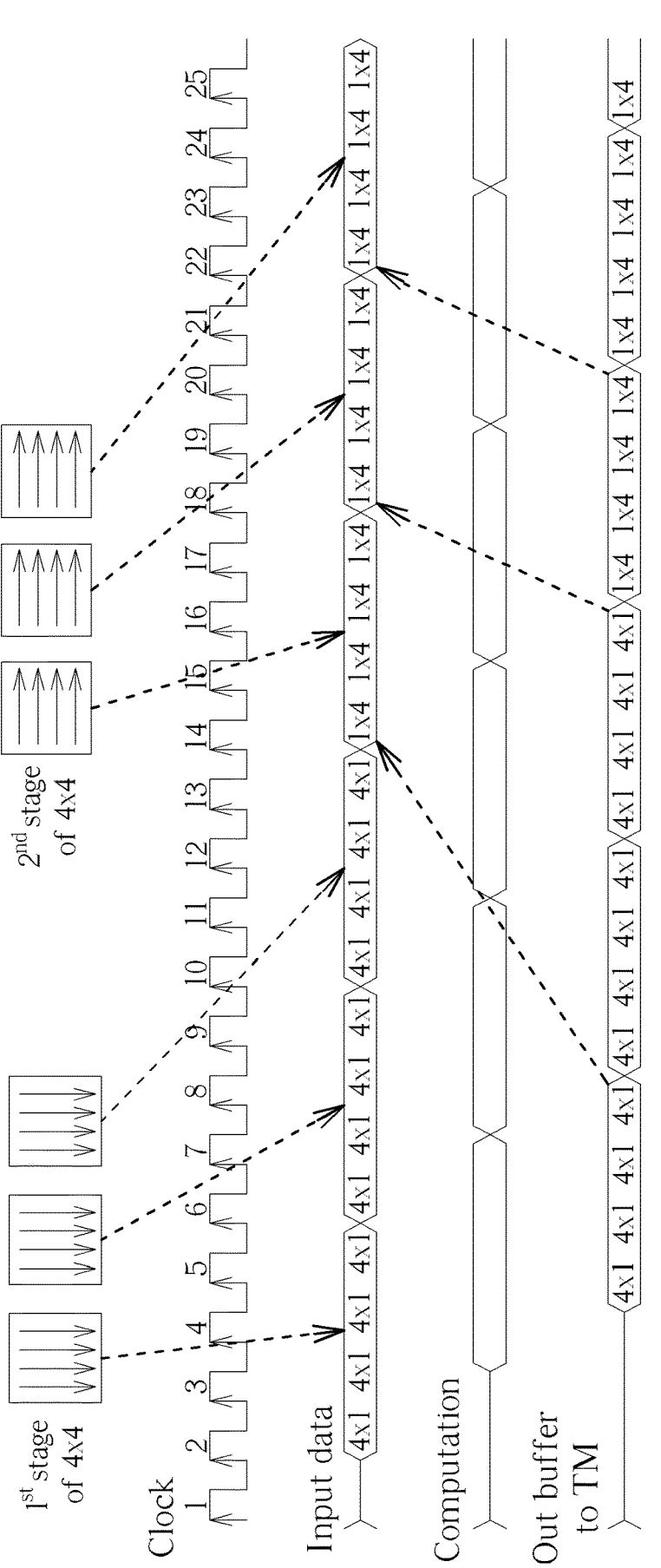
FIG. 7 is a timing diagram of the video processing circuit shown in FIG. 4.

After a $1^{st}$ stage processing result of a block is stored into the ring FIFO TM buffer 406, the ring FIFO TM buffer 406 requires some clock cycles to process the $1^{st}$ stage processing result for preparing and outputting transposed data to undergo the $2^{nd}$ stage transform. Since the SPIPO computation circuit 402 can apply $1^{st}$ stage transform to consecutive blocks, the clock cycles needed by the ring FIFO TM buffer 406 for preparing transposed data of the first block of the consecutive blocks may be hidden in the clock cycles needed by the SPIPO computation circuit 402 for performing $1^{st}$ stage transform upon other block(s) of the consecutive blocks, thereby solving the bubble cycle issue resulting from switching between the $1^{st}$ stage and the $2^{nd}$ stage. Please refer to FIG. 6 in conjunction with FIG. 7. FIG. 6 is a timing diagram of a conventional design with degraded performance due to the bubble cycle issue resulting from switching between the $1^{st}$ stage and the $2^{nd}$ stage. FIG. 7 is a timing diagram of the video processing circuit 400 shown in FIG. 4. Compared to the conventional design, the proposed high performance serial architecture enables the transform circuit 102 and/or the inverse transform circuit 106/208 to have better performance due to bubble cycle reduction.

Figure 8:
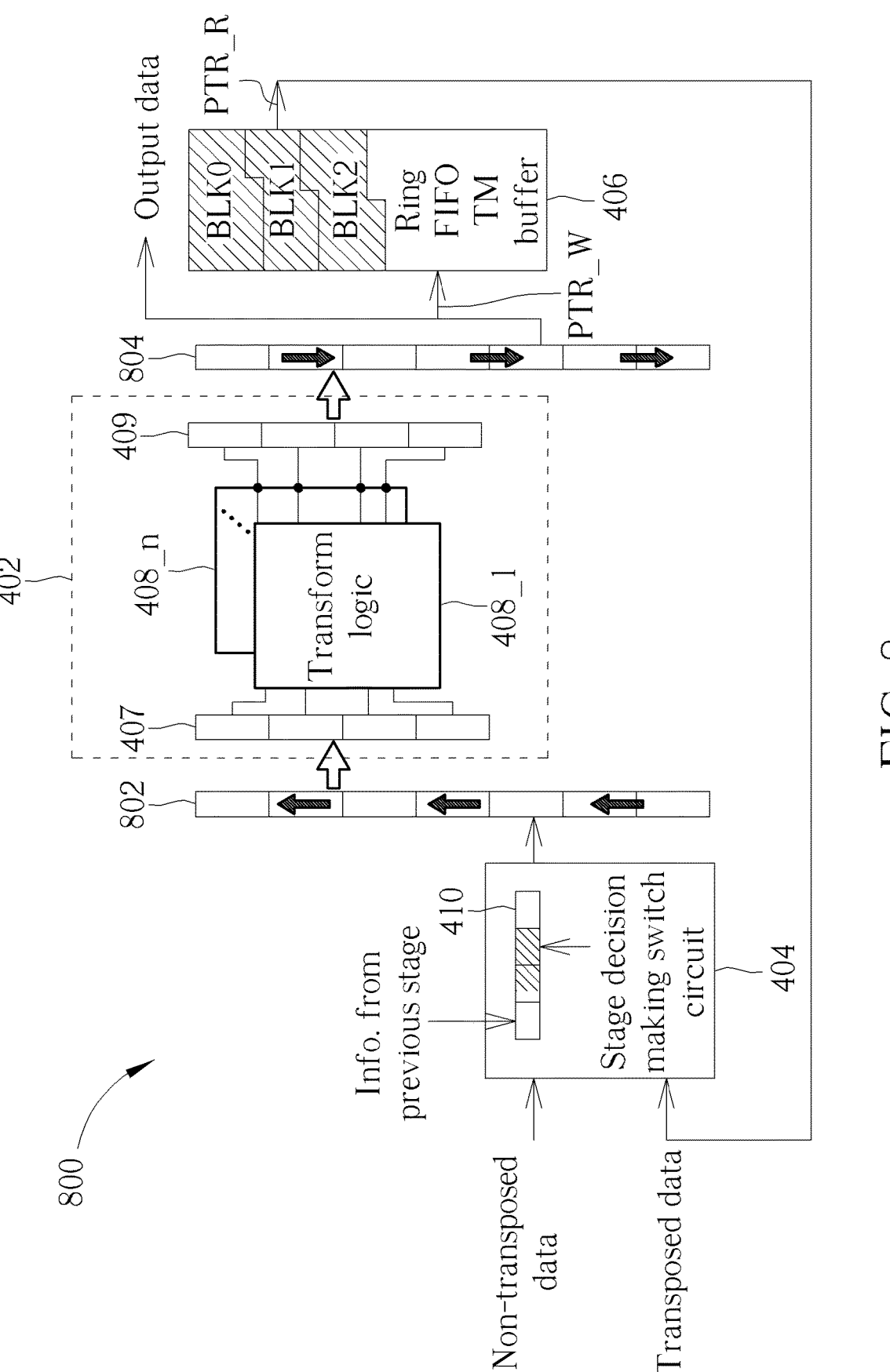
FIG. 8 is a diagram illustrating another video processing circuit with high performance serial architecture according to an embodiment of the present invention.

FIG. 8 is a diagram illustrating another video processing circuit with high performance serial architecture according to an embodiment of the present invention. For example, the transform circuit 102 of the video encoding apparatus 100 may be implemented by the video processing circuit 800. For another example, the inverse transform circuit 106 of the video encoding apparatus 100 may be implemented by the video processing circuit 800. For yet another example, the inverse transform circuit 208 of the video decoding apparatus 200 may be implemented by the video processing circuit 800. The major difference between the video processing circuits 400 and 800 is that the video processing circuit 800 further includes a serial in variable out (SIVO) buffer 802 and a variable in serial out (VISO) buffer 804.

The SIVO buffer 802 is coupled between the stage decision making switch circuit 404 and the SPIPO computation circuit 402. The output data of the stage decision making switch circuit 404 is serially pushed into the SIVO buffer 802 in a constant throughput, and all data of a complete line included in each of the consecutive blocks (e.g. BLK0, BLK2, and BLK2) is popped from the SIVO buffer 802 and transmitted to the SPIPO computation circuit 402 in a parallel fashion.

The VISO buffer 804 is coupled between the SPIPO computation circuit 402 and the ring FIFO TM buffer 406, and is also coupled between the SPIPO computation circuit 402 and a latter stage. All data of a complete line included in each of the consecutive blocks (e.g. BLK0, BLK2, and BLK2) is generated from the SPIPO computation circuit 402 and pushed into the VISO buffer 804 in a parallel fashion, and data buffered in the VISO buffer 804 is serially popped from the VISO buffer 804 to a latter stage or the ring FIFO TM buffer 406 in a constant throughput.

Figure 9:
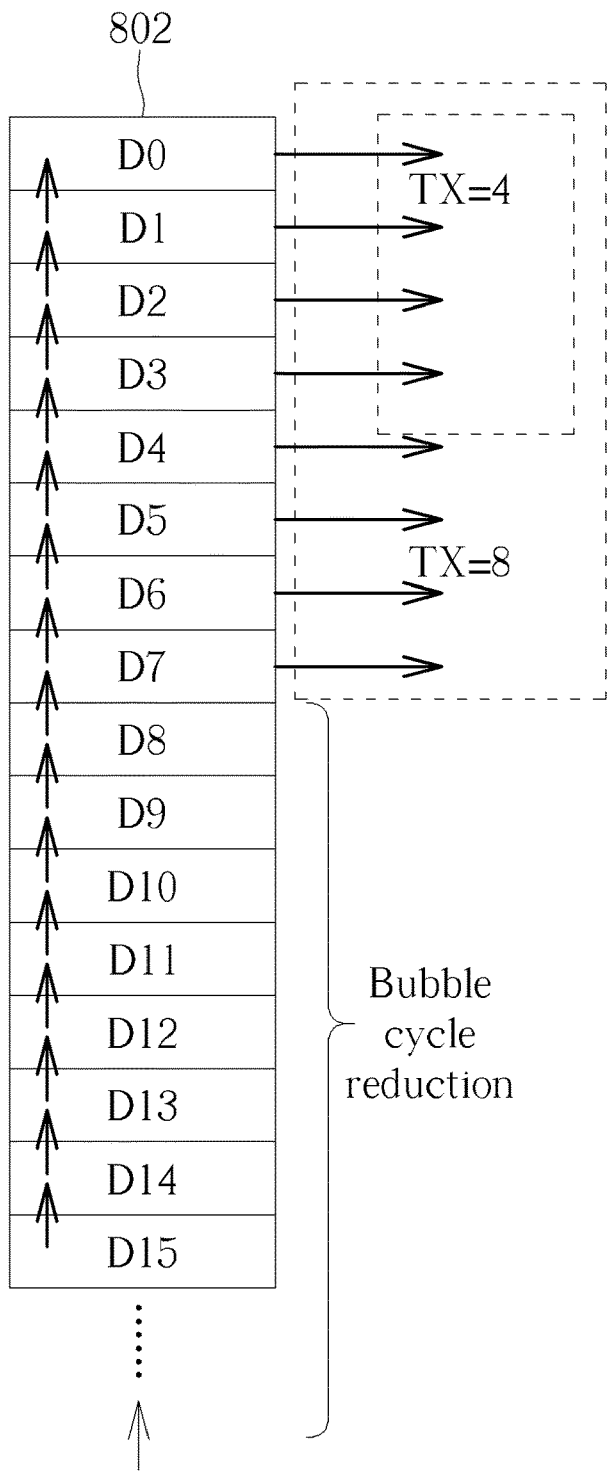
FIG. 9 is a diagram illustrating an example of the SIVO buffer shown in FIG. 8.
Figure 10:
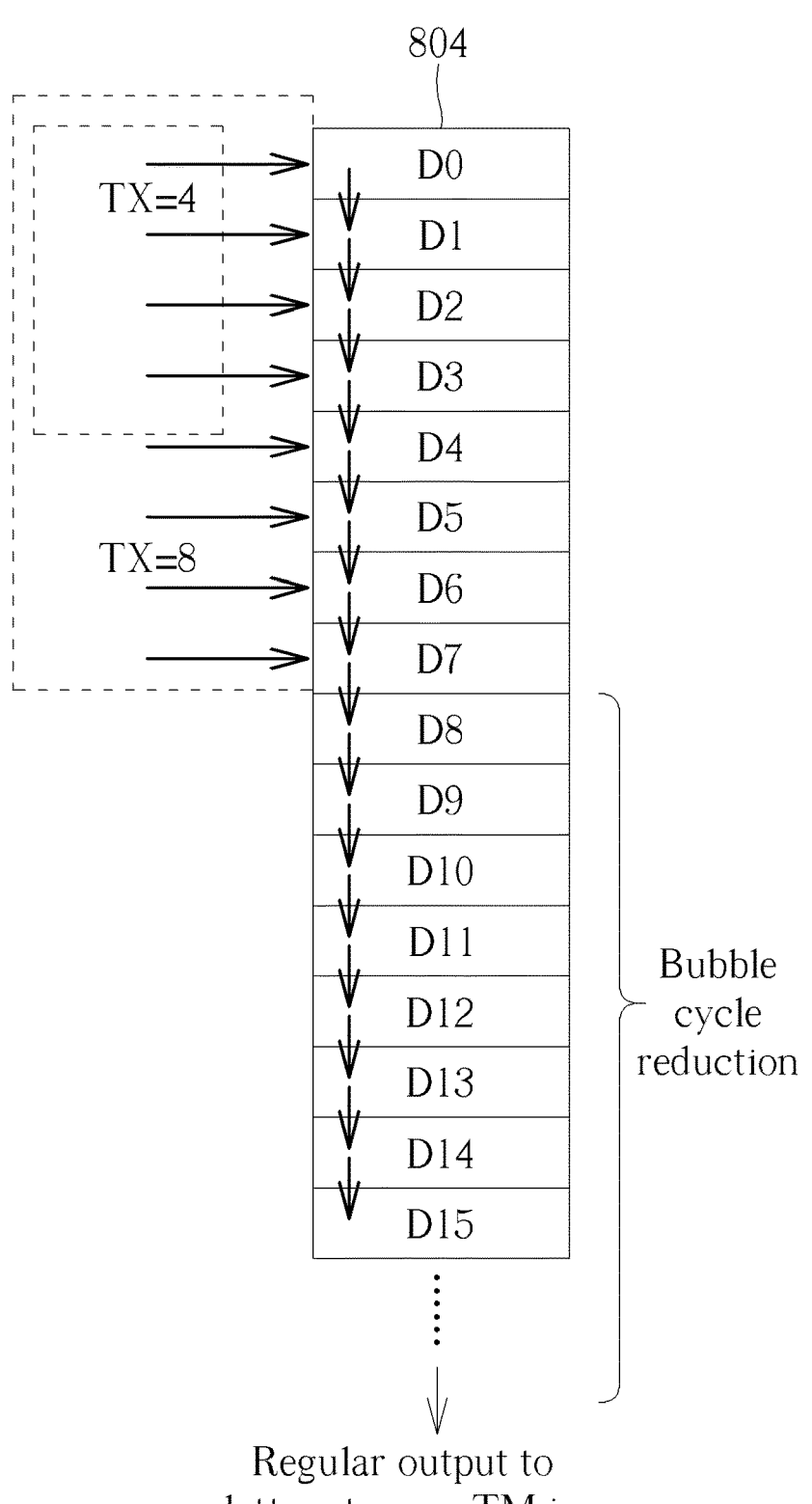
FIG. 10 is a diagram illustrating an example of the VISO buffer shown in FIG. 8.

To address the bubble cycle issue resulting from switching from a small block to a large block, the SIVO buffer 802 is designed to have a buffer size large enough to buffer data belonging to different lines at the same time, and the VISO buffer 804 is designed to have a buffer size large enough to buffer data belonging to different lines at the same time. Specifically, a spare buffer size of the SIVO buffer 802/ VISO buffer 804 can be used for bubble cycle reduction. FIG. 9 is a diagram illustrating an example of the SIVO buffer 802 shown in FIG. 8. FIG. 10 is a diagram illustrating an example of the VISO buffer 804 shown in FIG. 8. The SPIPO computation circuit 402 needs to wait for a complete line (e.g., a complete row or a complete column) to start the computation, and generates and outputs a processing result of the complete line, where the possible width and height of one transform block may range from 1, 2, 4, 8, 16, 32, to 64 in VVC. In a case where the transform block size is 4×4, the SIVO buffer 802 outputs 4 samples (non-transposed data or transposed data) to the SPIPO computation circuit 402 in a parallel fashion when all of the 4 samples are ready in the SIVO buffer 802, and the SPIPO computation circuit 402 outputs 4 samples to the VISO buffer 804 in a parallel fashion when all of the 4 samples are ready in the SPIPO computation circuit 402. In another case where the transform block size is 8×8, the SIVO buffer 802 outputs 8 samples (non-transposed data or transposed data) to the SPIPO computation circuit 402 in a parallel fashion when all of the 8 samples are ready in the SIVO buffer 802, and the SPIPO computation circuit 402 outputs 8 samples to the VISO buffer 804 in a parallel fashion when all of the 8 samples are ready in the SPIPO computation circuit 402. The spare buffer size in the SIVO buffer 802 can be used to buffer samples of other line(s). Similarly, the spare buffer size in the VISO buffer 804 can be used to buffer samples of other line(s).

Figure 11:
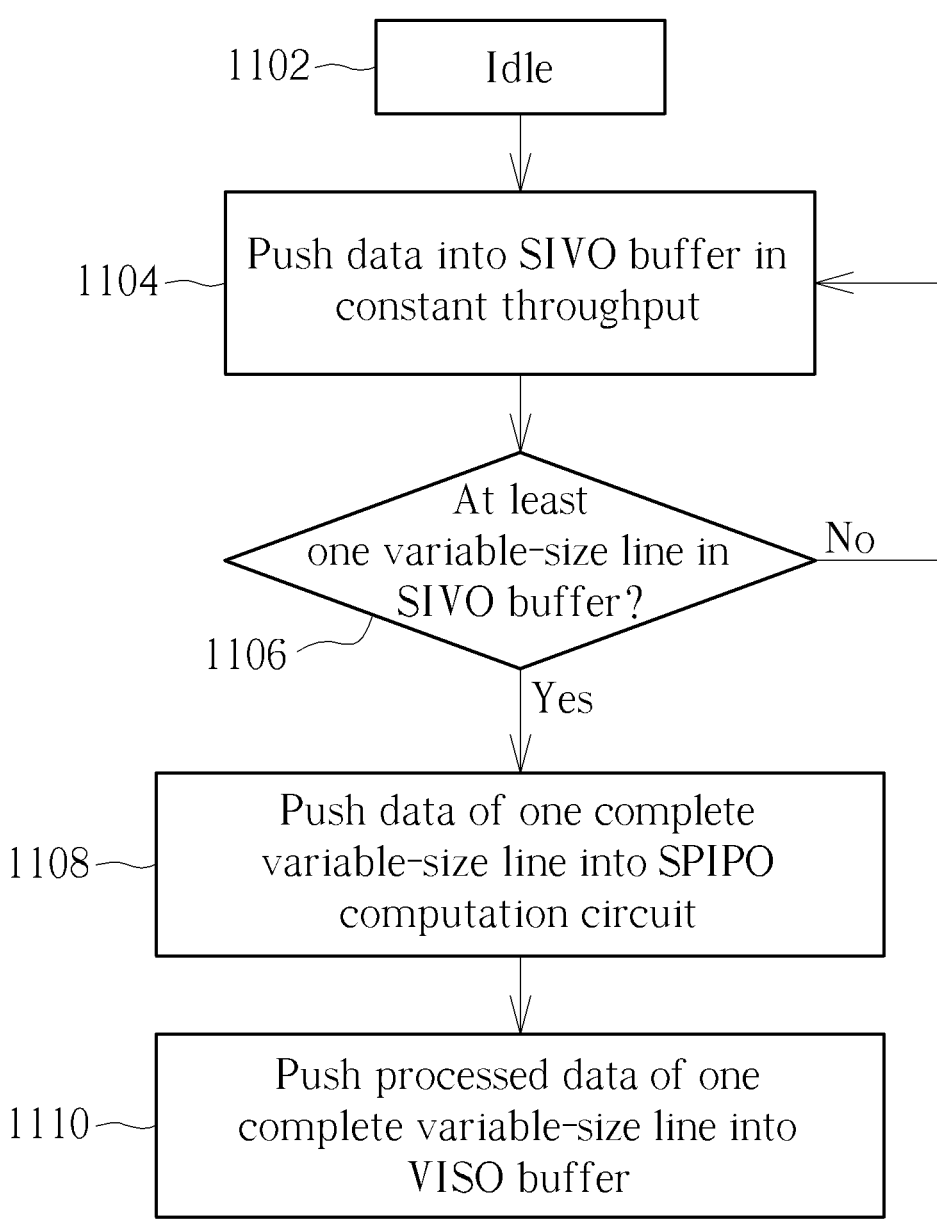
FIG. 11 is a flowchart illustrating a data transfer method according to an embodiment of the present invention.

FIG. 11 is a flowchart illustrating a data transfer method according to an embodiment of the present invention. Provided that the result is substantially the same, the steps are not required to be executed in the exact order shown in FIG. 11. Initially, the SIVO buffer 802 and the VISO buffer 804 enter an idle state (Step 1102). At step 1104, the stage decision making circuit 404 pushes data into the SIVO buffer 802 in a constant throughput. At step 1106, the SIVO buffer 802 determines if it has data of at least one variable-size line. If the SIVO buffer 802 does not have data of at least one variable-size line, the flow proceeds with step 1104. If the SIVO buffer 802 has data of at least one variable-size line, the SIVO buffer 802 pops data of one complete variable-size line and pushes the data of one complete variable-size line into the SPIPO computation circuit 402 for $1^{st}$ stage processing or $2^{nd}$ stage processing (Step 1108). At step 1110, the SPIPO computation circuit 402 generates processed data of one complete variable-size line, and pushes the processed data of one complete variable-size line into the VISO buffer 804.

After a $2^{nd}$ stage processing result of a last complete line of a current block is generated by the SPIPO computation circuit 402, the SPIPO computation circuit 402 needs to wait for a $1^{st}$ complete line of a next block to be ready, and the ring FIFO TM buffer 406 needs to wait for a $1^{st}$ stage processing result of the $1^{st}$ complete line of the next block to be ready. With the help of the SIVO buffer 802 and/or the VISO buffer 804, the data preparation may be hidden in the clock cycles needed by the SPIPO computation circuit 402 for performing $1^{st}$ stage transform and $2^{nd}$ stage transform.

Figure 12:
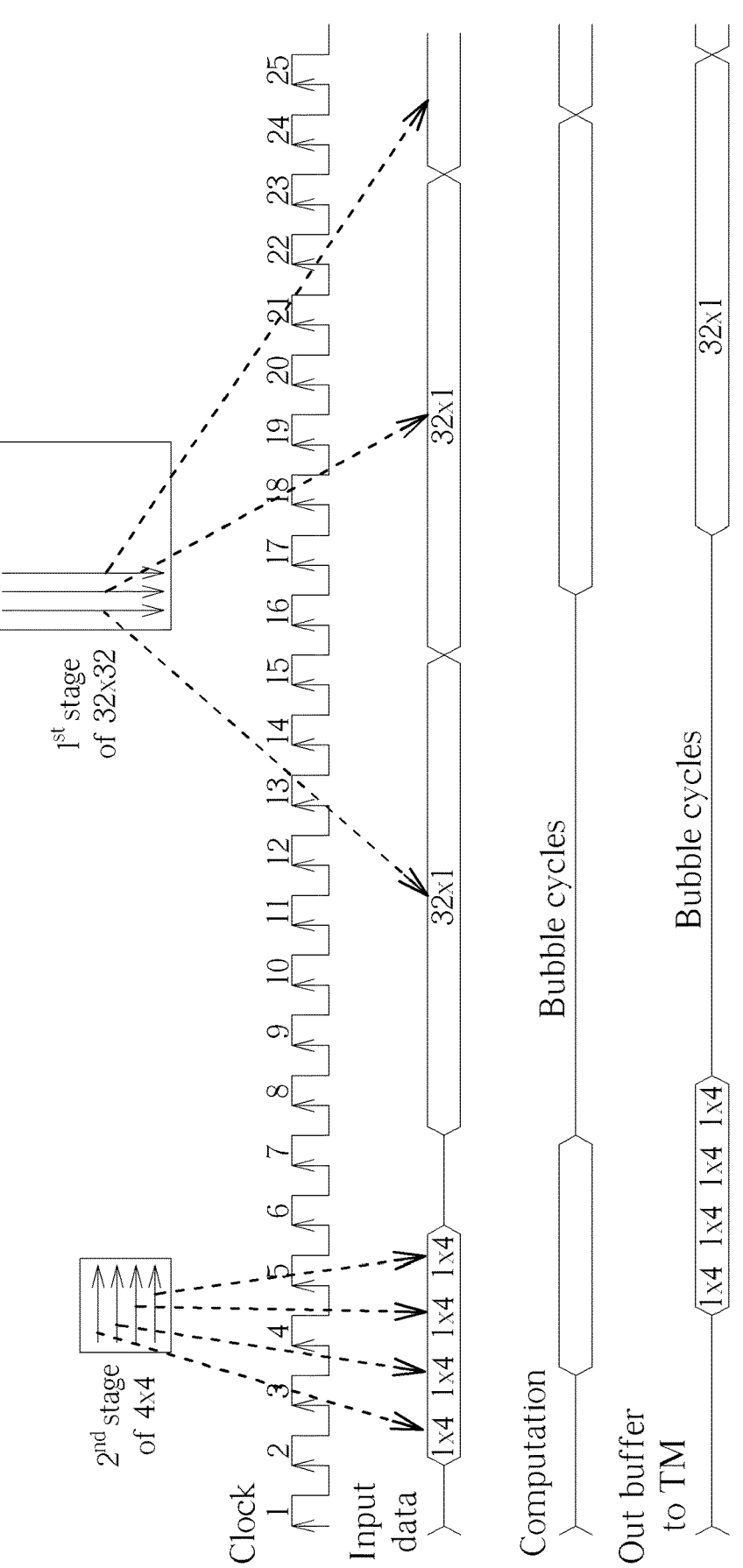
FIG. 12 is a timing diagram of a conventional design with degraded performance due to the bubble cycle issue resulting from switching from a small block to a large block.
Figure 13:
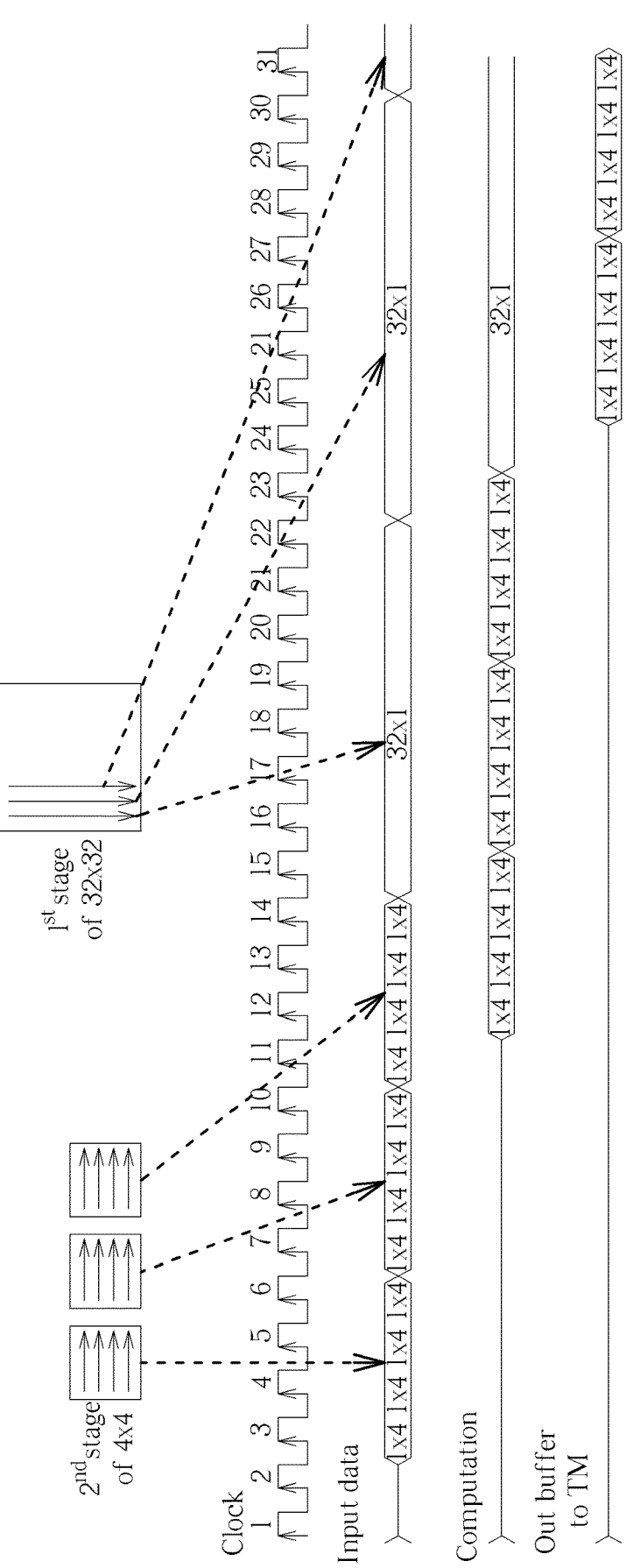
FIG. 13 is a timing diagram of the video processing circuit shown in FIG. 8.

Please refer to FIG. 12 in conjunction with FIG. 13. FIG. 12 is a timing diagram of a conventional design with degraded performance due to the bubble cycle issue resulting from switching from a small block to a large block. FIG. 13 is a timing diagram of the video processing circuit 800 shown in FIG. 8. Compared to the conventional design, the proposed high performance serial architecture enables the transform circuit 102 and/or the inverse transform circuit 106/208 to have better performance due to bubble cycle reduction.

The video processing circuit 800 with the high performance serial architecture may be employed by a video decoder to achieve 4K @ 60 FPS (frames per second). For certain video applications that require 8K @ 30 FPS, the present invention proposes high performance parallel architecture.

Figure 14:
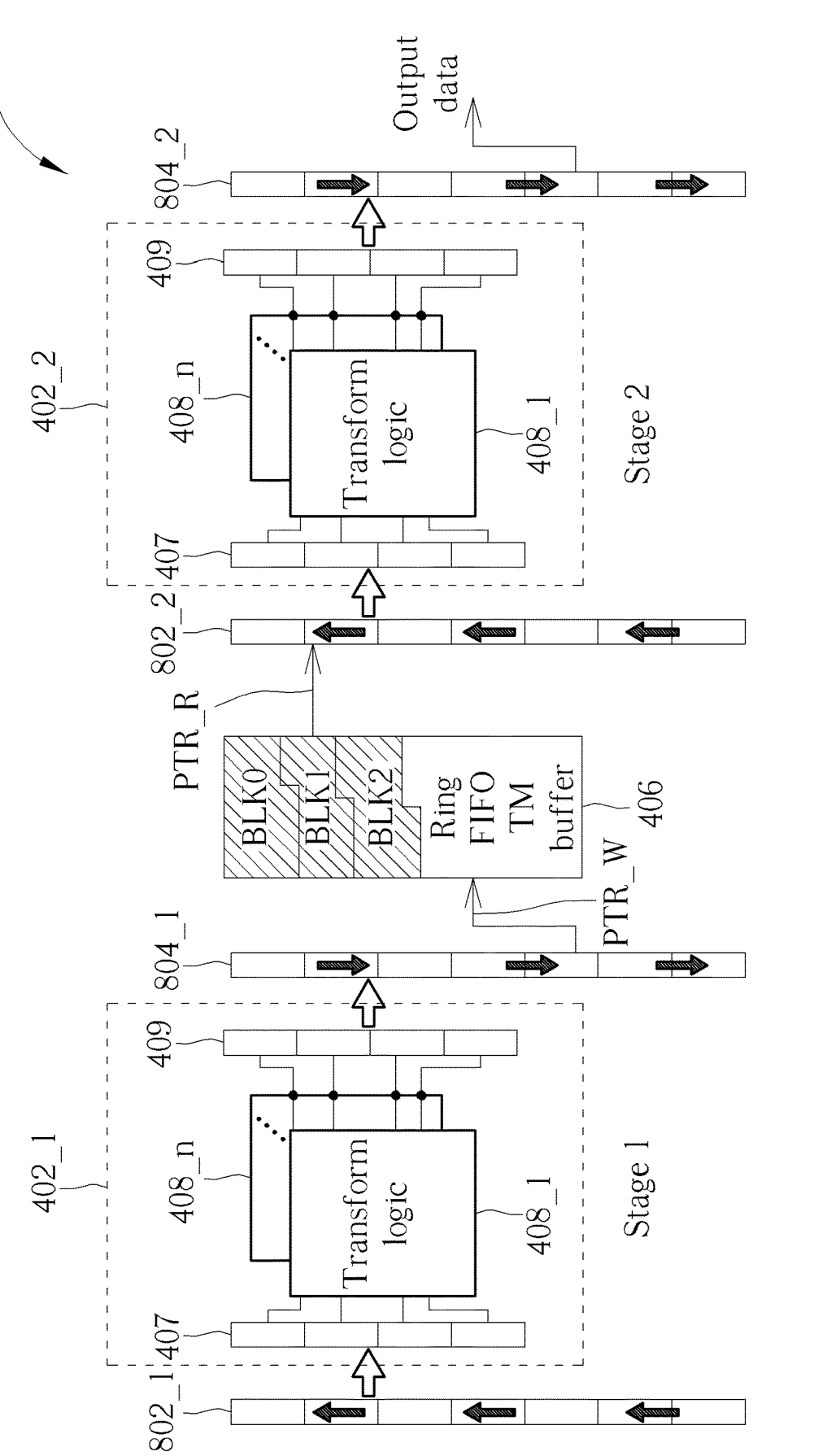
FIG. 14 is a diagram illustrating a video processing circuit with high performance parallel architecture according to an embodiment of the present invention.

FIG. 14 is a diagram illustrating a video processing circuit with high performance parallel architecture according to an embodiment of the present invention. For example, the transform circuit 102 of the video encoding apparatus 100 may be implemented by the video processing circuit 1400. For another example, the inverse transform circuit 106 of the video encoding apparatus 100 may be implemented by the video processing circuit 1400. For yet another example, the inverse transform circuit 208 of the video decoding apparatus 200 may be implemented by the video processing circuit 1400. Compared to the high performance serial architecture having one common SPIPO computation circuit 402 shared by $1^{st}$ stage transform and $2^{nd}$ stage transform, the high performance parallel architecture employs two SPIPO computation circuits dedicated to $1^{st}$ stage transform and $2^{nd}$ stage transform, respectively. As shown in FIG. 14, the video processing circuit 1400 includes two SPIPO computation circuits 402_1, 402_2 each having the same architecture of the SPIPO computation circuit 402, the ring FIFO TM buffer 406, two SIVO buffers 802_1, 802_2 each having the same architecture of SIVO buffer 802, and two VISO buffers 804_1, 804_2 each having the same architecture of VISO buffer 804.

To address the bubble cycle issue resulting from switching between the $1^{st}$ stage and the $2^{nd}$ stage, each of the SPIPO computation circuits 402_1, 402_2 is designed to support processing of consecutive blocks (i.e. consecutive TBs) in a row at the same stage, and the ring FIFO TM buffer 406 is designed to support buffering of $1^{st}$ stage processing results of consecutive blocks (i.e. consecutive TBs). To address the bubble cycle issue resulting from switching from a small block to a large block, each of the SIVO buffers 802_1, 802_2 is designed to have a buffer size large enough to buffer data belonging to different lines at the same time, and each of the VISO buffers 804_1, 804_2 is designed to have a buffer size large enough to buffer data belonging to different lines at the same time. Since a person skilled in the pertinent art can readily understand technical features of the video processing circuit 1400 after reading paragraphs directed to the video processing circuits 400 and 800, further description is omitted here for brevity.

In above embodiments, a video processing circuit (e.g. transform circuit or inverse transform circuit) may employ all techniques proposed by the present invention to address both of the bubble cycle issues. However, these are for illustrative purposes only, and are not meant to be limitations of the present invention. For example, a video processing circuit (e.g. transform circuit or inverse transform circuit) may employ some of the techniques proposed by the present invention to address only one of the bubble cycle issues. These alternative designs all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing circuit comprising:
a first buffer; and
a first computation circuit, wherein before a second one-dimensional processing operation is performed upon a plurality of consecutive blocks in a second direction, the first computation circuit is arranged to generate a first processing result for each of the plurality of consecutive blocks by performing a first one-dimensional processing operation upon said each of the plurality of consecutive blocks in a first direction that is different from the second direction, and is further arranged to store a plurality of first processing results of the plurality of consecutive blocks into the first buffer;
wherein after the first one-dimensional processing operation is performed upon the plurality of consecutive blocks, the first computation circuit retrieves each of the plurality of first processing results from the first buffer, and is reused to perform the second one-dimensional processing operation upon said each of the plurality of consecutive blocks according to the first processing result that is generated by the first one-dimensional processing operation for said each of the plurality of consecutive blocks.

2. The video processing circuit of claim 1, further comprising:
a stage decision making switch circuit, arranged to set input data of the first computation circuit by adaptively switching between non-transposed data of the plurality of consecutive blocks provided from a previous stage of the video processing circuit and transposed data of the plurality of consecutive blocks provided from the first buffer.

3. The video processing circuit of claim 2, wherein the stage decision making switch circuit comprises:
a second buffer, arranged to buffer information of the plurality of consecutive blocks that is provided from the previous stage;
the stage decision making switch circuit refers to the information in the second buffer for adaptively selecting one of the non-transposed data and the transposed data as the input data of the first computation circuit.

4. The video processing circuit of claim 2, wherein the stage decision making switch circuit is further arranged to refer to a buffer status of the first buffer for adaptively selecting one of the non-transposed data and the transposed data as the input data of the first computation circuit.

5. The video processing circuit of claim 2, further comprising:
a third buffer, coupled between the stage decision making switch circuit and the first computation circuit, wherein output data of the stage decision making switch circuit is serially pushed into the third buffer, all data of a complete line included in said each of the plurality of consecutive blocks is popped from the third buffer and transmitted to the first computation circuit in a parallel fashion, and the third buffer buffers data belonging to different lines at a same time.

6. The video processing circuit of claim 2, further comprising:

a fourth buffer, coupled between the first computation circuit and a latter stage of the video processing circuit and also coupled between first computation circuit and the first buffer, wherein all data of a complete line included in said each of the plurality of consecutive blocks is generated from the first computation circuit and pushed into the fourth buffer in a parallel fashion, data buffered in the fourth buffer is serially popped from the fourth buffer, and the fourth buffer buffers data belonging to different lines at a same time.

7. The video processing circuit of claim 1, wherein the video processing circuit is an inverse transform circuit or a transform circuit.

8. The video processing circuit of claim 1, wherein the first buffer is a ring first in, first out (FIFO) buffer.

9. A video processing circuit comprising:

a first buffer;

a first computation circuit, wherein before a second one-dimensional processing operation is performed upon a plurality of consecutive blocks in a second direction, the first computation circuit is arranged to generate a first processing result for each of the plurality of consecutive blocks by performing a first one-dimensional processing operation upon said each of the plurality of consecutive blocks in a first direction that is different from the second direction, and is further arranged to store a plurality of first processing results of the plurality of consecutive blocks into the first buffer; and a second computation circuit, arranged to retrieve each of the plurality of first processing results from the first buffer, and perform the second one-dimensional processing operation upon said each of the plurality of consecutive blocks in the second direction according to the first processing result that is generated by the first one-dimensional processing operation for said each of the plurality of consecutive blocks.

10. The video processing circuit of claim 9, further comprising:

a fifth buffer, coupled between a previous stage of the video processing circuit and the first computation circuit, wherein output data of the previous stage is serially pushed into the fifth buffer, all data of a complete line included in said each of the plurality of consecutive blocks is popped from the fifth buffer and transmitted to the first computation circuit in a parallel fashion, and the fifth buffer buffers data belonging to different lines at a same time.

11. The video processing circuit of claim 9, further comprising:

a sixth buffer, coupled between the first computation circuit and the first buffer, wherein all data of a complete line included in said each of the plurality of consecutive blocks is generated from the first computation circuit and pushed into the sixth buffer in a parallel fashion, data buffered in the sixth buffer is serially popped from the sixth buffer, and the sixth buffer buffers data belonging to different lines at a same time.

12. The video processing circuit of claim 9, further comprising:

a seventh buffer, coupled between the first buffer and the second computation circuit, wherein output data of the first buffer is serially pushed into the seventh buffer, all data of a complete line included in said each of the plurality of consecutive blocks is popped from the seventh buffer and transmitted to the second computation circuit in a parallel fashion, and the seventh buffer buffers data belonging to different lines at a same time.

13. The video processing circuit of claim 9, further comprising:

an eighth buffer, coupled between the second computation circuit and a latter stage of the video processing circuit, wherein all data of a complete line included in said each of the plurality of consecutive blocks is generated from the second computation circuit and pushed into the eighth buffer in a parallel fashion, data buffered in the eighth buffer is serially popped from the eighth buffer, and the eighth buffer buffers data belonging to different lines at a same time.

14. A video processing circuit comprising:

a computation circuit, arranged to generate a processing result for each of a plurality of consecutive blocks by performing a one-dimensional processing operation upon said each of the plurality of consecutive blocks in one direction; and a buffer, coupled to the computation circuit, wherein input data of the buffer is serially pushed into the buffer, all data of a complete line included in said each of the plurality of consecutive blocks is popped from the buffer and transmitted to the computation circuit in a parallel fashion, and the buffer buffers data belonging to different lines at a same time.

15. The video processing circuit of claim 14, wherein the video processing circuit is an inverse transform circuit or a transform circuit.

16. A video processing circuit comprising:

a computation circuit, arranged to generate a processing result for each of a plurality of consecutive blocks by performing a one-dimensional processing operation upon said each of the plurality of consecutive blocks in one direction; and a buffer, coupled to the computation circuit, wherein all data of a complete line included in said each of the plurality of consecutive blocks is generated from the computation circuit and pushed into the buffer in a parallel fashion, data buffered in the buffer is serially popped from the buffer, and the buffer buffers data belonging to different lines at a same time.

17. The video processing circuit of claim 16, wherein the video processing circuit is an inverse transform circuit or a transform circuit.

\* \* \* \* \*